United States Patent
Daley et al.

(10) Patent No.: US 11,461,715 B2
(45) Date of Patent: Oct. 4, 2022

(54) COGNITIVE ANALYSIS TO GENERATE AND EVALUATE IMPLEMENTATION PLANS

(71) Applicant: International Business Machines Corporation, Armonk, NY (US)

(72) Inventors: Stan Kevin Daley, Atlanta, GA (US); Tao Liu, Dublin, OH (US); Harish Bharti, Dublin, OH (US); Jayant Kumar Sinha, Dublin (IE); Zheng Xie, Clontarf (IE); Joy Patra, Dublin (IE); Abhay Patra, Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 412 days.

(21) Appl. No.: 16/838,474

(22) Filed: Apr. 2, 2020

(65) Prior Publication Data
US 2021/0312361 A1 Oct. 7, 2021

(51) Int. Cl.
*G06F 40/279* (2020.01)
*G06Q 10/06* (2012.01)
*G06N 20/00* (2019.01)

(52) U.S. Cl.
CPC ..... *G06Q 10/06313* (2013.01); *G06F 40/279* (2020.01); *G06N 20/00* (2019.01)

(58) Field of Classification Search
CPC ............ G06Q 10/06313; G06F 40/279; G06N 20/00; G06N 5/003; G06N 5/022
USPC .......................................................... 704/9
See application file for complete search history.

(56) References Cited

U.S. PATENT DOCUMENTS

| 8,935,239 B2 | 1/2015 | Mukherjee et al. |
| 9,489,419 B2 | 11/2016 | Miller |
| 10,248,472 B2 | 4/2019 | Erickson et al. |

OTHER PUBLICATIONS

Janus, Steffen Soulejman. 2016. Becoming a Knowledge-Sharing Organization : A Handbook for Scaling Up Solutions through Knowledge Capturing and Sharing. World Bank, Washington, DC. © World Bank. https://openknowledge.worldbank.org/handle/10986/25320 License: CC By 3.0 IGO.

IP.com No. IPCOM000253572D | Cognitive Moderator | Authors et. al.: Disclosed Anonymously | IP.com Electronic Publication Date: Apr. 12, 2018.

(Continued)

*Primary Examiner* — Thierry L Pham
(74) *Attorney, Agent, or Firm* — Patterson + Sheridan, LLP

(57) ABSTRACT

Techniques for text evaluation are provided. A curated dataset comprising a plurality of textual documents is received. A tree of classifiers is trained, based on the curated dataset, to identify use cases. A feature graph model is generated, based on the curated dataset, to determine textual similarity. A new document is received, and a plurality of requirements is extracted from the new document. For each requirement, one or more vector scores are generated by evaluating the requirement using the tree of classifiers, one or more feature scores are generated by evaluating the requirement using the feature graph model, and one or more use cases are identified for the new textual document based on the one or more vector scores and the one or more feature scores. An implementation is generated for the new document based on the one or more use cases.

20 Claims, 6 Drawing Sheets

(56) References Cited

OTHER PUBLICATIONS

Authors et. al.: Disclosed Anonymously | A Decentralized Architecture for Transparent and Verifiable Knowledge Manipulation in Untrusted Networks | IP.com No. IPCOM000251032D | IP.com Electronic Publication Date: Oct. 2, 2017.
Authors et. al.: Disclosed Anonymously | A Cognitive Problem-Solution Retrieval Engine (CPSRE) Integrated with Dynamic Perception Similarity Analysis (DPSA) | IP.com No. IPCOM00025-2577D | IP.com Electronic Publication Date: Jan. 28, 2018.
Https://www.rfpio.com | RFPIO | Mar. 24, 2020, RFP Software-Request for Proposal Tool for RFP Response Automation & Management.
Https://www.rfp365.com/ | RFP360 | Feb. 26, 2020 | RFP Sotware & Proposal Tool-Simply Your Process | Accessed Mar. 24, 2020.
Https://www.softwareadvice.com/rfp/ | Software Advice | Accessed Mar. 24, 2020 | RFP Software.
Https://www.softwareadvice.com/rfp/endeavorcpq-profile/ | Software Advice | Accessed Mar. 24, 2020 | EndeavorCPQ Software.
Http://r3bsolutions.com/win/wincenter-for-capture-and-proposal-management/?source=capterrawc | R3 Business Solutions | Accessed Mar. 24, 2020 | R3 Wincenter for Capture and Proposal Management.
Https://www.softwareadvice.com/rfp/pandadoc-profile/ | Software Advice | Accessed Mar. 24, 2020 | PandaDoc Software.
Http://qvidian-rfp.com/ | Accessed Mar. 24, 2020 | RFP Automation Responses | Wouldn't You Just Love To Delete A Few Meetings?
Sheshasayee et al., "Comparative Analysis of Clustering Techniques for Requirements Clustering," Middle-East Journal of Scientific Research 21 (7): 1097-1102,2014; ISSN 1990-9233.
N. Niu and S. Easterbrook, "On-Demand Cluster Analysis for Product Line Functional Requirements," 2008 12th International Software Product Line Conference, Limerick, 2008, pp. 87-96.
"A Use Case Based Approach to Feature Models' Construction", Bo Wang and Wei Zhang and Haiyan Zhao and Zhi Jin and Hong Mei, 2009 17th IEEE International Requirements Engineering Conference, pp. 121-130.
B. Kamsu-Foguem and V. Chapurlat,"Requirements Modelling and Formal Analysis using Graph Operations," [Accessed online Apr. 1, 2020] https://oatao.univ-toulouse.fr/992/1/kamsu_992.pdf.
"Application of Graph Theory to the Software Engineering," [Accessed Online Apr. 1, 2020] https://sites.google.com/site/appgraphsoftware/.
Duan, Chuan, "Clustering and its Application in Requirements Engineering" (2008). Technical Reports. Paper 7. http://via.library.depaul.edu/tr/7.
Kun Chen, Wei Zhang, Haiyan Zhao and Hong Mei, "An approach to constructing feature models based on requirements clustering," 13th IEEE International Conference on Requirements Engineering (RE'05), Paris, 2005, pp. 31-40.

COGNITIVE ANALYSIS TO GENERATE AND EVALUATE IMPLEMENTATION PLANS

BACKGROUND

The present disclosure relates to machine learning, and more specifically, to evaluating documents using machine learning to generate and evaluate implementation plans.

Information technology (IT) service providers frequently receive requests to deliver a set of services for clients, such as a request to build and deliver an online retail platform. These requests are used to create a contractual framework with the clients for delivering the services. This evaluation requires a deep understanding of the client requirements and focuses in order to design an overarching architecture that will solve the client's technical problems. To ensure effective solutions are provided, the provider generally must estimate the effort(s) required to solve the problem(s) and extrapolate them to create an optimal resource profile. This mix of resources must then be plotted within an implementation timeline, and is often used to derive a cost case that serves as a base for pricing in bidding for the client request. This process of creating these architectural artifacts, estimations, resource mixes, and implementation timelines is a highly complex and multi-dimensional problem. Existing systems are driven by extensive effort of subject matter experts, which results in added costs and delays. Further, these human experts are inherently biased and subjective, often leading to sub-optimal solutions.

SUMMARY

According to one embodiment of the present disclosure, a method is provided. The method includes receiving a curated dataset comprising a plurality of textual documents, each associated with a corresponding plurality of use cases; training a tree of classifiers, based on the curated dataset, to identify use cases in received documents; generating a feature graph model, based on the curated dataset, to determine textual similarity; receiving a new textual document; extracting a plurality of requirements from the new textual document; for each respective requirement of the plurality of requirements: generating one or more respective vector scores by evaluating the respective requirement using the tree of classifiers; generating one or more respective feature scores by evaluating the respective requirement using the feature graph model; and identifying one or more use cases for the new textual document based on the one or more respective vector scores and the one or more respective feature scores; and generating an implementation for the new textual document based on the identified one or more use cases.

According to a second embodiment of the present disclosure, a computer program product is provided. The computer program product comprises one or more computer-readable storage media collectively containing computer-readable program code that, when executed by operation of one or more computer processors, performs an operation. The operation includes receiving a curated dataset comprising a plurality of textual documents, each associated with a corresponding plurality of use cases; training a tree of classifiers, based on the curated dataset, to identify use cases in received documents; generating a feature graph model, based on the curated dataset, to determine textual similarity; receiving a new textual document; extracting a plurality of requirements from the new textual document; for each respective requirement of the plurality of requirements: generating one or more respective vector scores by evaluating the respective requirement using the tree of classifiers; generating one or more respective feature scores by evaluating the respective requirement using the feature graph model; and identifying one or more use cases for the new textual document based on the one or more respective vector scores and the one or more respective feature scores; and generating an implementation for the new textual document based on the identified one or more use cases.

According to a third embodiment of the present disclosure, a system is provided. The system includes one or more computer processors, and one or more memories collectively containing one or more programs which, when executed by the one or more computer processors, performs an operation. The operation includes receiving a curated dataset comprising a plurality of textual documents, each associated with a corresponding plurality of use cases; training a tree of classifiers, based on the curated dataset, to identify use cases in received documents; generating a feature graph model, based on the curated dataset, to determine textual similarity; receiving a new textual document; extracting a plurality of requirements from the new textual document; for each respective requirement of the plurality of requirements: generating one or more respective vector scores by evaluating the respective requirement using the tree of classifiers; generating one or more respective feature scores by evaluating the respective requirement using the feature graph model; and identifying one or more use cases for the new textual document based on the one or more respective vector scores and the one or more respective feature scores; and generating an implementation for the new textual document based on the identified one or more use cases.

DETAILED DESCRIPTION

Figure 1:
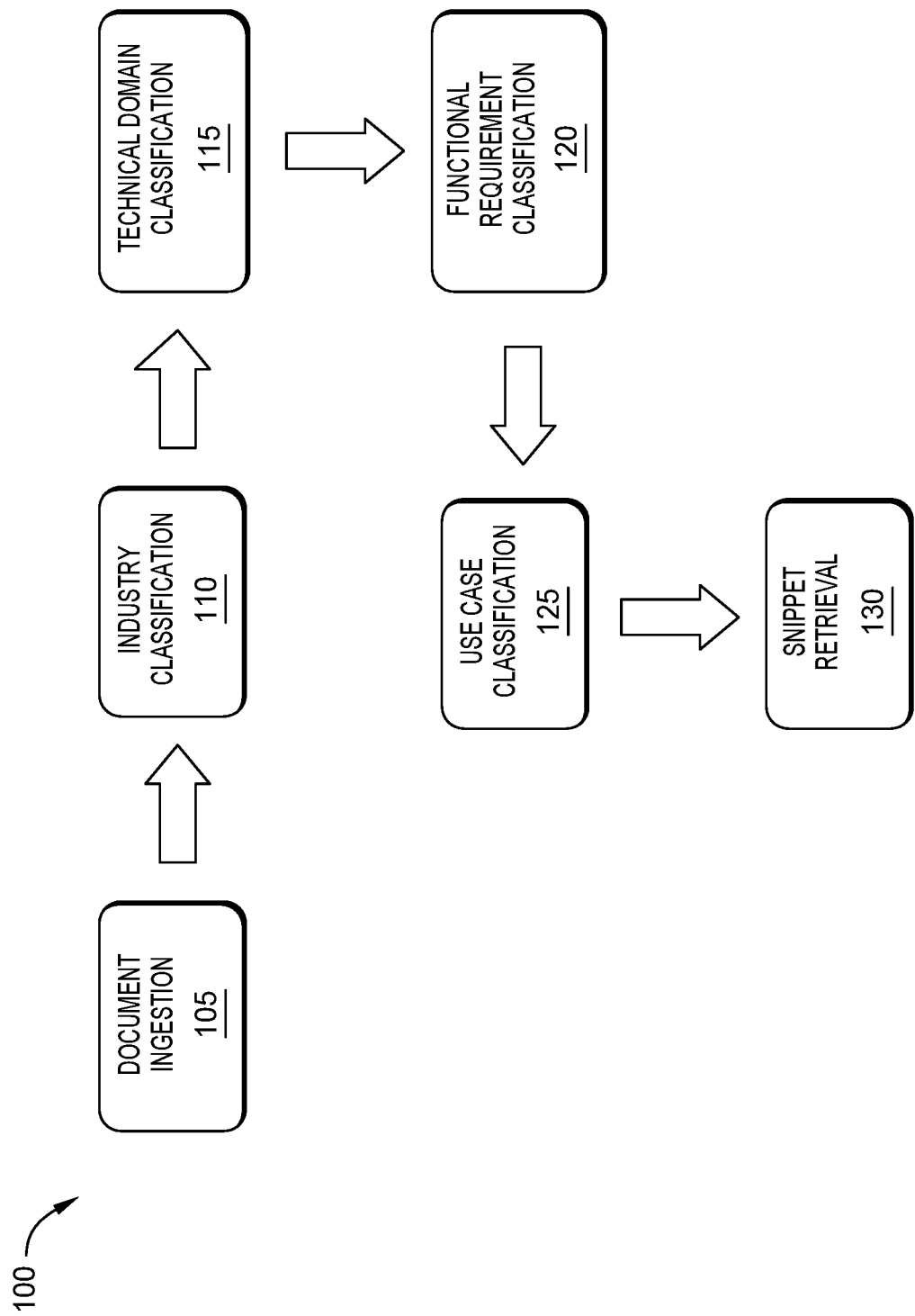
FIG. 1 illustrates a workflow for utilizing machine learning to perform document evaluation in order to generate improved implementation architectures, according to one embodiment disclosed herein.

Embodiments of the present disclosure provide techniques and machine learning (ML)-based architectures to dynamically evaluate request documents in order to generate and analyze implementation plans to respond to the requests. This ML process allows the evaluation to be performed in an objective and consistent manner, resulting in improved solutions as compared to manually generated solutions. Further, the techniques described herein enable solutions to be generated more rapidly and reliably than existing human-based efforts, which results in decreased costs and delay.

In rapidly changing technical environments today, technical requests from clients have grown increasingly complex. This complexity can include many different aspects of the requirements, such as the solution domain, frequent non-functional requirements, and significant contracting terms (which often include strenuous penalties for the IT provider, if the solution does not address each portion of the request). Responses to such requests are frequently disqualified by clients because they fail to address one or more of the client requirements.

Moreover, the time allotted to evaluate and accept or decline such requests has grown increasingly shorter, as clients demand rapid delivery of technical services. This shortened timeframe allows for less time to analyze the request, craft a solution, and vet it within technical, commercial, and competitive frameworks. Some embodiments of the present disclosure provide artificial intelligence (AI) assisted tools to generate solution artifacts, standardize them for consistency, and provide assurances with respect to the quality of the solution. In one embodiment, techniques tied to a computer system are provided to extract use cases from request in order to enable other systems to estimate the required effort and services, based on the extracted use cases, so that a complete pipeline can be constructed to improve the cost, latency, and accuracy of the implementation process.

Many existing approaches involve force fitting client requests to a list of provider capabilities and/or use cases using dictionaries. However, client requests frequently utilize new cases and new terminology that makes such an approach inaccurate. Similarly, many existing systems are focused on what the service provider can provide, rather than on what client requires. Additionally, when requirements overlap (e.g., because of similarities between multiple use cases under different functional capabilities), users may treat multiple sets of use cases as highly relevant, which results in waste.

One embodiment of the present disclosure provides a highly automated and intelligent system that translates client request documents (and/or a detailed set of requirements) into an implementation plan that resolves the client's technical needs. In some embodiments, the system further evaluates and converts the implementation into a concrete staffing plan and cost case as with significant precision. At least one embodiment of the present disclosure identifies use cases by utilizing complementary techniques that allow back and forth traversal of requirements (rather than a traditional linear pipeline), under various functional and technical capabilities.

Additionally, in some embodiments, the system combines a vector space model and a feature graph model to yield improved results. In an embodiment, the vector space model is traversed using a tree of ML-based classifiers to evaluate input text. In some embodiments, the feature graph model can be built based on frequently co-occurring terms in text. For example, in one embodiment, the system mines the associations among terms in a labeled training set, and captures this information in one or more graphs. To classify a newly-received request into relevant use case categories, in one embodiment, a distance similarity approach is applied to characterize the similarity of the request and each use case category. In some embodiments, both a vector space model and a feature graph model each produce a respective classification score, which can be combined (e.g., using a weighted average model). This aggregate score results in increased accuracy and confidence.

Some embodiments of the present disclosure further provide techniques to identify orphan use cases for a given repository. As used herein, the use case repository is a collection of known/supported use cases (e.g., used to train one or more ML classifiers), and a use case is "orphaned" if it is not represented or reflected in the repository. In one embodiment, the system identifies orphaned use case (which have not been accounted for in the training data set and are not included in the current corpus) for further evaluation. Such an approach can yield significantly better results than attempting to force fit a requirement into the known use cases.

In at least one embodiment, the system further provides techniques to identify and evaluate potential service provider partners for any orphaned use cases. In one such embodiment, the system evaluates orphaned use cases against one or more repositories maintained by partners. If the orphaned use cases is reflected in a partner repository, in one embodiment, the system can incorporate those partner use cases into the original training set. Advantageously, the system does not require intervention of a domain expert to label this data. Furthermore, in some embodiments, once potential partners are identified, the system provides techniques to rank each based on a probability of success. This helps to identify the risks of engaging with any given partner to satisfy the orphaned use cases.

In some embodiments, once the set of use cases have been identified, the system can analyze it based on prior knowledge. For example, the system may classify each use case based on complexity, and identify estimation and staffing needs based on a repository of prior implementation plans. This allows the system to generate an implementation plan that fully addresses the client requirements, while optimizing costs and structure. Further, using this implementation plan and similar prior data, the system may estimate a cost of a given solution (e.g., resource cost, monetary cost, time cost, and the like).

FIG. 1 illustrates a workflow 100 for utilizing machine learning to perform document evaluation in order to generate improved implementation architectures, according to one embodiment disclosed herein. In the illustrated workflow 100, to ingest a requirements document, a series of classifiers can be utilized for each successive step. Although the illustrated workflow 100 is depicted as a pipeline, in some embodiments, the system utilizes back and forth traversal in the workflow 100 (e.g., stepping forward and backward in the workflow 100 as needed) to refine each model and enrich the training data set. In an embodiment, the workflow 100 utilizes a hierarchical tree of classifiers that can be applied in sequence, beginning from a top level of the classifier tree and proceeding down towards the branches. This approach enables the system to reduce the number of leaf classifiers that are potentially applicable for each step of the analysis. This reduces the overall processing time, and results in better performance of the system and models.

The workflow 100 begins with Document Ingestion 105. In an embodiment, the system utilizes textual documents (e.g., natural language text) defining the requirements of a given technical deployment. For example, the request document may specify that the final solution should provide an account management system with a number of requirements/characteristics such as password management, account creation and deletion, order tracking, and the like. During Document Ingestion 105, the implementation system can convert this textual document to a structured format, generate one or more vector representations, and the like. In another embodiment, Document Ingestion 105 includes converting formatted textual documents into simple text, such as by stripping off the formatting of the document. For example, the system may convert Portable Document Formats (PDFs), spread sheets, or other formats into simple strings of text.

The workflow 100 then continues to a stage for Industry Classification 110. In an embodiment, this stage involves evaluating all or a portion of the input document, or a vector representation thereof, using a trained ML model that identifies the relevant industry for the request. In one embodiment, this classifier is trained based on a repository of labeled use cases (e.g., from prior solutions, from partner systems, from human users, and the like). In an embodiment, each use cases includes descriptive text that is vectorized by the implementation system. In one embodiment, the system vectorizes the text by extracting features (e.g., terms) and assigning numeric values to each. In some embodiments, the features can include key words and/or phrases which are unique or relevant to the use case. Typically, because of the number and diversity of use cases, it is impossible for a human to identify these key phrases. In some embodiments, therefore, one or more topic modelling techniques are utilized. Such techniques can be used to identify the key phrases from a document set and summarize these phrases. In an embodiment, the key phrases identified by such topic modelling techniques can be used to vectorize the training set and fit a ML model to form a hypersphere in a multi-dimensional space. These vectors can also be used to extract the relevant features and associations used to fit the feature graph model, discussed in more detail below.

In an embodiment, in addition to relevant features for each use case, the use case can also include a label indicating the relevant industry. In this way, the newly-received textual document can be analyzed to identify and retrieve a set of key terms and/or phrases, and these features can be analyzed using the trained classifier to determine the relevant industry. Once this industry is identified, in the illustrated embodiment, the workflow 100 proceeds to Technical Domain Classification 115. For example, for an "energy" industry, one relevant technical domain may include "Internet of Things," which corresponds to things like smart meters, transformer sensors, and the like. As another example, for a "retail" industry, a technical domain can be "commerce" corresponding to purchase of goods. In contrast, for a "service" industry, the same technical domain of "commerce" corresponds to purchasing services. Thus, the use cases within a given technical domain can differ based on the industry.

In an embodiment, this is a hierarchical approach, as discussed above. That is, each industry may be associated with a respective set of technical domains. Thus, in an embodiment, the implementation system trains and applies a respective technical domain ML classifier for each industry. In some embodiments, therefore, the system identifies and selects the relevant classifier for the Technical Domain Classification 115 based at least in part on the industry identified during Industry Classification 110.

In the illustrated workflow 100, this identified technical domain is used in a stage for Functional Requirement Classification 120. This stage can include a set of one or more classifiers trained specifically for the identified technical domain, similar to the above discussion with respect to Technical Domain Classification 115 and the identified industry. In an embodiment, this stage further includes extracting portions of the request document that correspond to functional requirements, as opposed to technical requirements or other text that does not relate to a requirement. As used herein, a functional requirement generally relates to the desired functionality of the ultimate system (e.g., "the platform must allow users to manually delete their history data") while a technical requirement relates to practical aspects of the system (e.g., "the platform should be able to support up to one thousand users simultaneously).

In an embodiment, the identified and extracted functional requirements can then be used during Use Case Classification 125 to identify relevant use cases for the requirements. As discussed above, a use case is a concrete functional element for the system. For example, if the functional requirement is "users can change their password," a corresponding use case may be labeled as "password management." In contrast, technical requirements relate more to characteristics like the expected or required minimum load and/or bandwidth for elements of the system, rather than to functionality that must be implemented. In one embodiment, each use case classifiers is a one-class classifier trained to output a binary result indicating whether the input functional requirement does or does not involve the use case. In this way, each functional requirement may map to multiple use cases (and each use case may map to multiple functional requirements).

In the illustrated workflow 100, the system then performs Snippet Retrieval 130, which includes identifying and extracting, for each identified use case, snippets of text from the received document. These snippets correspond to the segments of text (e.g., terms and phrases) that triggered the corresponding use case classification. In some embodiments, these snippets can be provided to one or more subject matter experts to validate the classifications and allow for continued training and refinement of the models. This validation can be performed continuously, during an initial training phase, periodically, and the like. The workflow 100 thus depicts one technique for utilizing vector representations of text (e.g., a vector space model) to identify use cases for a given input document.

Figure 2:
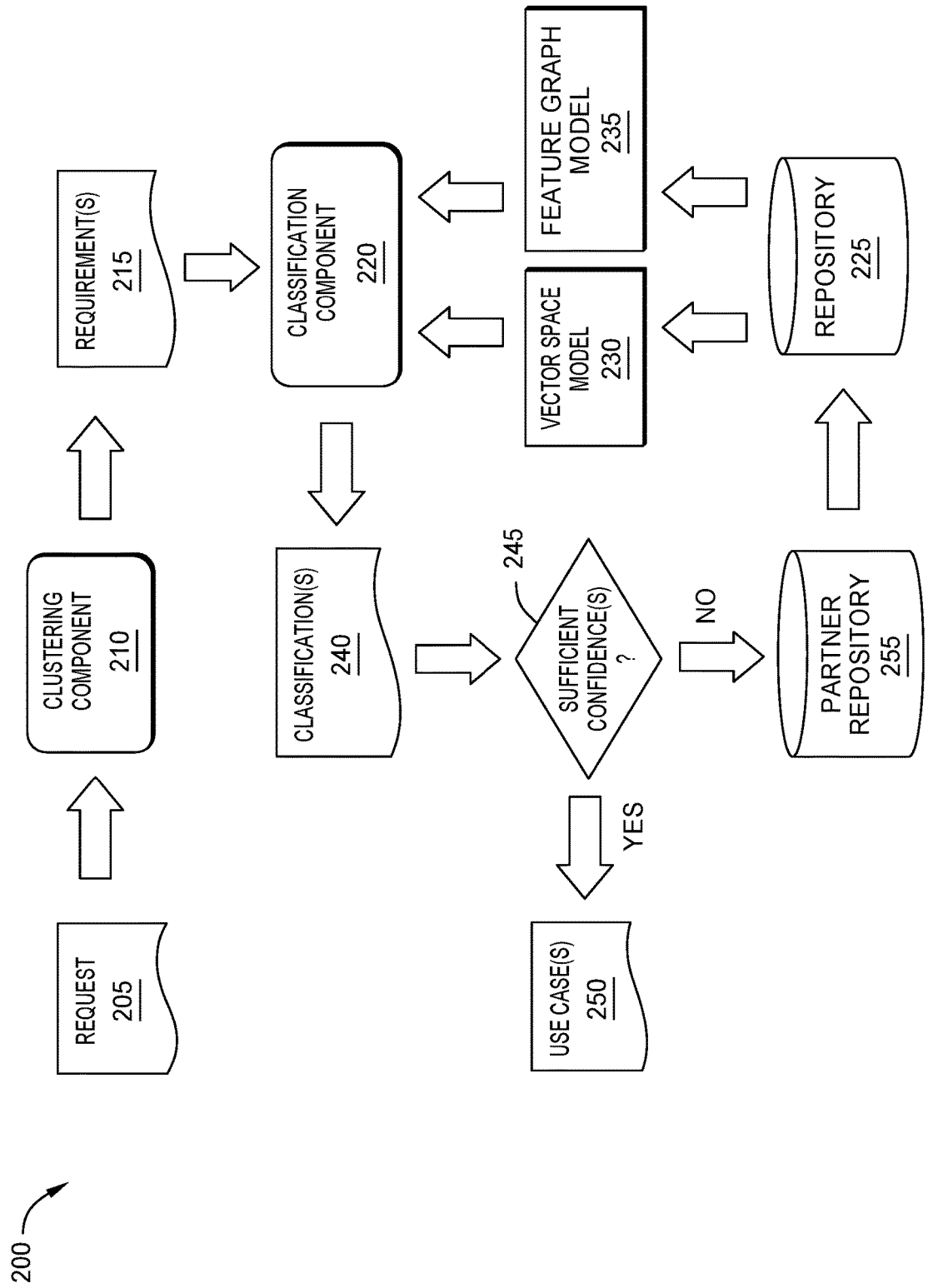
FIG. 2 illustrates a workflow for ingesting and evaluating documents using an iterative and non-linear machine learning process, according to one embodiment disclosed herein.

FIG. 2 illustrates a workflow 200 for ingesting and evaluating documents using an iterative and non-linear machine learning process, according to one embodiment disclosed herein. In one embodiment, the workflow 200 provides additional detail for the iterative and back-and-forth analysis discussed above. The workflow 200 begins when a Request 205 is received by the implementation system. As discussed above, in an embodiment, the Request 205 includes a textual document that generally describes the needs of the client, and can include both technical requirements and functional requirements. In the illustrated embodiment, the Request 205 is a natural language document with relatively little structure (e.g., without explicit labels for each requirement and/or use case).

The Request 205 is evaluated by a Clustering Component 210 to generate a set of Requirements 215 (also referred to as requirement clusters). For example, in one such embodiment, the requirements relating to transformer health monitoring (e.g., system and performance measurements, temperature, pressure, and load monitoring, and the like) may be clustered together. In an embodiment, each Requirement 215 may be a technical requirement, a functional requirement. In some embodiments, requirements can be clustered as functional or non-functional. The non-functional requirements can be further clustered as technical non-functional requirements (e.g., requirements relating to response time) and non-technical non-functional requirements (e.g., terms and conditions). This requirements clustering may be accomplished by applying pre-trained classifiers. In at least one embodiment, these requirements are mapped to nodes in the classification tree (discussed above, and described in more detail below with reference to FIG. 3) to identify use cases. In the illustrated workflow 200, the Requirements 215 are provided to a Classification Component 220 which generates a set of Classifications 240. The Classifications 240 generally correspond to use cases that potentially satisfy the Requirements 215.

In one embodiment, prior to processing the new Request 205, the Classification Component 220 is trained based a training set of existing (pre-analyzed) requests, as discussed above. In some embodiments, a tree of classifiers is trained based on this labeled data. In one such embodiment, the top-most node in the tree relates to the industry, while the next level down in the hierarchical tree correspond to technical capabilities/requirements and functional capabilities/requirements. Finally, under the functional capabilities/requirements, the tree can include a set of use cases.

In one embodiment, to train this tree of classifiers, a semi-supervised approach is utilized. In such an embodiment, the curated request texts, which have been analyzed and categorized previously (such as by domain experts), serve as labeled training data. The corresponding relevant use cases for each request text are used as the labels for the text. In an embodiment, the labeled request texts are categorized to form requirement clusters for the system. In one such embodiment, the Clustering Component 210 maps all or portions of newly-received Requests 205 to relevant requirement cluster(s) for the system. This enhances the tree of the classification model, as discussed in more detail below. Such a semi-supervised approach can thus be used to enable the system to learn over time and improve the maturity and cluster granularity. For example, the text in a Request 205 may classified to create Classifications 240. When the classification confidence is higher than a predefined threshold, the text can be added automatically to the Repository 225 as labelled data to further train and refine the Vector Space Model 230 and/or Feature Graph Model 235. This continuous semi-supervised training enables the system to continuously learn over time and improve the maturity and cluster granularity.

In some embodiments, the Classification Component 220 iteratively evaluates each Requirement 215 to map them to node(s) in the classifier tree using one or more ML models. In the illustrated embodiment, both a Vector Space Model 230 and a Feature Graph Model 235 are used to generate aggregate classification scores. As illustrated, these models are trained using a set of pre-labeled textual requests (e.g., request labeled with correct use cases) in a Repository 225. In one embodiment, the Vector Space Model 230 includes one or more classification models that produce a relatively accurate classification output. In this Vector Space Model 230, the text from each cluster of Requirements 215 is first used to generate one or more feature vectors using the same vocabulary that was originally used to train the classifier(s). In some embodiments, the feature vectors can then be projected to the hypersphere of the classifier, and the distance to the relevant decision boundary or boundaries can be measured to determine a confidence. Stated differently, the collection of training data for a given label can be vectorized and projected to the multi-dimensional space to form a hypersphere for that given label. Subsequently, the newly provided text in Request 205 can similarly be vectorized and projected to the hypersphere. The distance between this vector to the boundary of the hypersphere can then be used to determine the confidence of the classification. For example, if the distance is small, it means that vector is nearly on the boundary, in which case the confidence is low. Thus, the vectors can be provided as input to the model, resulting in one or more output classifications, each with a confidence determined based on the distance between the vector and the boundary of the classification.

In one embodiment, the Vector Space Model 230 allows the system to preserve the fundamental features of the document, but lacks nuance or understanding relating to associations among discrete features. In some embodiments, these associations among features can provide more information relating to the rich semantics of the document. Thus, in some embodiments, the Classification Component 220 combines the strengths of the Vector Space Model 230 with a Feature Graph Model 235. The Feature Graph Model 230 is built based at least in part on frequently co-occurring terms in the training text. A similarity function can then be utilized to compare Request 205 to the training documents, in order to obtain a classification score.

In some embodiments, creating the Feature Graph Model 235 generally includes a sequence of steps beginning with key term extraction from the training documents. For each document, the system can then identify and extract terms that occur within a threshold distance of each other with a minimum amount. For example, the system may identify pairs of terms that occur within five words of each other at least ten times in the document. Once all documents have been so analyzed, the system can build a weighted and directed Feature Graph Model 235 reflecting the co-occurring terms. In one such embodiment, the nodes of the feature graph correspond to key terms/phrases, while each edge indicates that the corresponding terms/phrases associated with the end-nodes co-occur in the training corpus. In one embodiment, the weight of each edge is determined based on the frequency of this co-occurrence. Similarly, the directionality of each edge may be based on the directionality of the relationship (e.g., if one term always or nearly-always precedes the other).

In some embodiments, the system builds an aggregate feature graph for the set of training documents. In another embodiment, the system creates a discrete feature graph for each document. That is, each training document may have a corresponding feature graph indicating the relationships between terms in the document. These graphs then collectively represent the Feature Graph Model 230. In an embodiment, to apply the Feature Graph Model 235 to the determined Requirements 215, the Classification Component 220 utilizes a distance matrix as a similarity function in order to classify each requirement cluster/the overall Request 205. For example, in one embodiment, the Classification Component 220 identifies the most-similar feature graph(s) to the input Request 205/Requirements 215. The labels associated with these graphs (e.g., the labels associated with the corresponding training document) can then be used as classifications for each Requirement 215.

In the illustrated embodiment, both the Vector Space Model 230 and the Feature Graph Model 235 are used to produce respective classification scores, classifying each Requirement 215 as corresponding to one or more use cases (or zero use cases, if the requirement is a technical requirement). The Classification Component 220 can then combine these distinct scores (e.g., using a weighted average method) to create more accurate Classifications 240. As discussed above, in some embodiments, each Requirement 215 may be mapped to multiple classifier nodes. That is, a single Requirement 215 may be mapped to one or more use cases, one or more technical capabilities, as well as a combination of use case(s) and technical capabilities. This helps to address the fact that Requests 205 typically have different granularities and overlapping requirements in the text.

At block 245, the implementation system evaluates each Classification 240 to determine whether it is associated with a sufficiently high confidence (e.g., above a predefined threshold). If so, the mappings are finalized to create a set of Use Cases 250 that reflect the needs of the client, as indicated in the Request 205. If a given Requirement 215 was not able to be mapped to any use case classifier with sufficient confidence, it is classified as an orphan requirement. These orphans can be used for further analysis to enhance the classifiers in the training space using supervised learning, thereby closing the feedback loop. For example, in one embodiment, the orphan Requirements 215 are provided to a subject matter expert for classification. The expert response can then be used to supplement the Repository 225 with new labeled data, and thereafter used to refine the Vector Space Model 230 and/or Feature Graph Model 235.

As depicted in the illustrated workflow 200, in some embodiments, some or all of the Requirements 215 (e.g., the orphan requirements) are first evaluated using one or more Partner Repositories 255, prior to (or instead of) relying on a subject matter expert. That is, rather than presenting orphaned Requirements 215 (e.g., any requirements that are classified with confidence below a predefined threshold), the Requirements 215 are first evaluated against existing/labeled use cases in one or more Partner Repositories 255. For each such Requirement 215, if there is a match in the Partner Repository 255, this Requirement 215 and the corresponding labelled use case (from the Partner Repository 255) can be ingested into the Repository 225 to serve as a new training document. This allows the system to continuously learn without the need for manual user classification or intervention.

Figure 3:
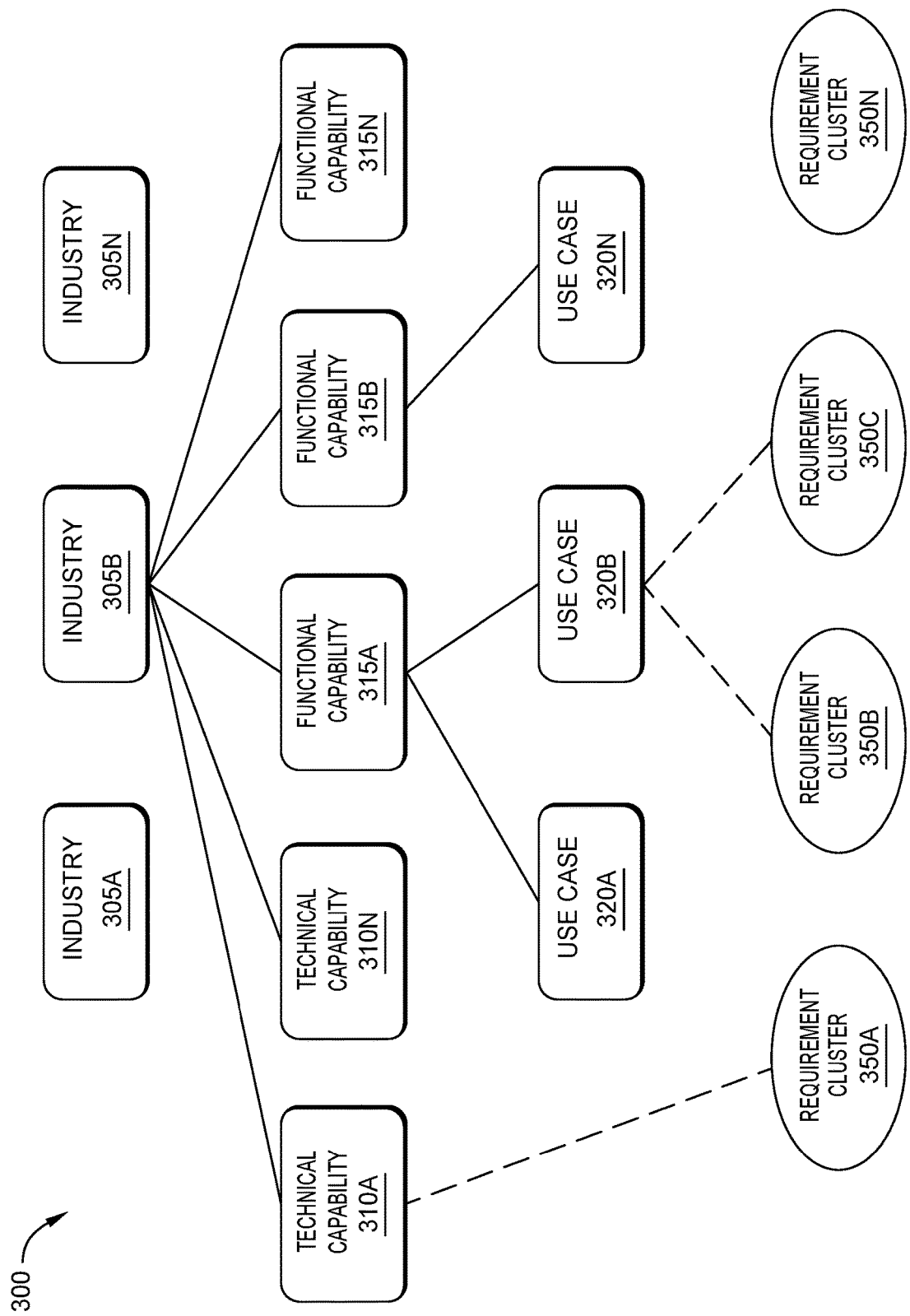
FIG. 3 depicts a graph illustrating a machine learning based document analysis process using a tree of classifiers, according to one embodiment disclosed herein.

FIG. 3 depicts a graph illustrating a machine learning based document analysis process using a tree of classifiers, according to one embodiment disclosed herein. In some embodiments of the present disclosure, as discussed above requests can include both technical and functional requirements, and each requirement may be mapped to technical capabilities classes or to functional use case classes. Further adding to the evaluation complexity, this mapping of requirements is not always one-to-one. For example, one requirement may be mapped to both a technical capability and a functional use case. In some embodiments, therefore, a graph (such as the Tree 300) is created and used for training the classifiers in the training space.

In the illustrated embodiment, by evaluating existing (pre-analyzed and labeled) requests, a Tree 300 of classifiers can be trained. As illustrated, there may be any number of Industry 305A-N classifications for the system. In some embodiments, a higher node in the Tree 300 acts as a root node, and the relevant Industry 305A-N node is identified. In another embodiment, each industry can be associated with a unique Tree 300, such that Industry 305A has a respective tree/graph, Industry 305B has the illustrated graph, and Industry 305N has yet another.

As illustrated, under the Industry 305B in the hierarchical Tree 300, a set of Technical Capabilities 310A-N and/or Functional Capabilities 315A-N are identified and classified. As discussed above, Technical Capabilities 310 generally relate to system requirements like minimum load, maximum latency, and the like. Functional Capabilities 315 generally relate to the functionality/operability of the system, such as the ability to place orders and pay online. Further, as depicted in the Tree 300, each Functional Capability 315A-N may have zero or more Use Cases 320A-N below it in the hierarchy. Thus, based on evaluating the training repository, the system has determined that Use Cases 320A and 320B correspond to the Functional Capability 315A, while the Use Case 320C corresponds to the Functional Capability 315B. Of course, each Functional Capability 315 may have any number of corresponding use cases.

In the illustrated embodiment, while processing a newly-received request, a set of Requirement Clusters 350A-N are generated. As discussed above, in some embodiments, the training repository is used to identify existing clusters of requirements (e.g., requirements that are sufficiently similar to each other). When a new request is received, it can be similarly evaluated to identify requirements and cluster these new requirements into the defined clusters. In some embodiments, as discussed above, these Requirement Clusters 350A-N are then mapped onto the leaf nodes of the Tree 300 based on a combination of a vector space (e.g., trained ML classifiers) and feature space (e.g., a feature graph model depicting relations between terms in the document). In the illustrated embodiment, the Requirement Cluster 350A has been mapped to Technical Capability 310A, while Requirement Clusters 350B and 350C both map to the Use Case 320B. Further, the Requirement Cluster 350N is an orphan requirement, in that it cannot be mapped with sufficient confidence to any node in the Tree 300. Thus, in an embodiment, the system can either present the Requirement Cluster 350N to an expert user for classification, and/or can evaluate the Requirement Cluster 350N against one or more partner repositories.

Figure 4:
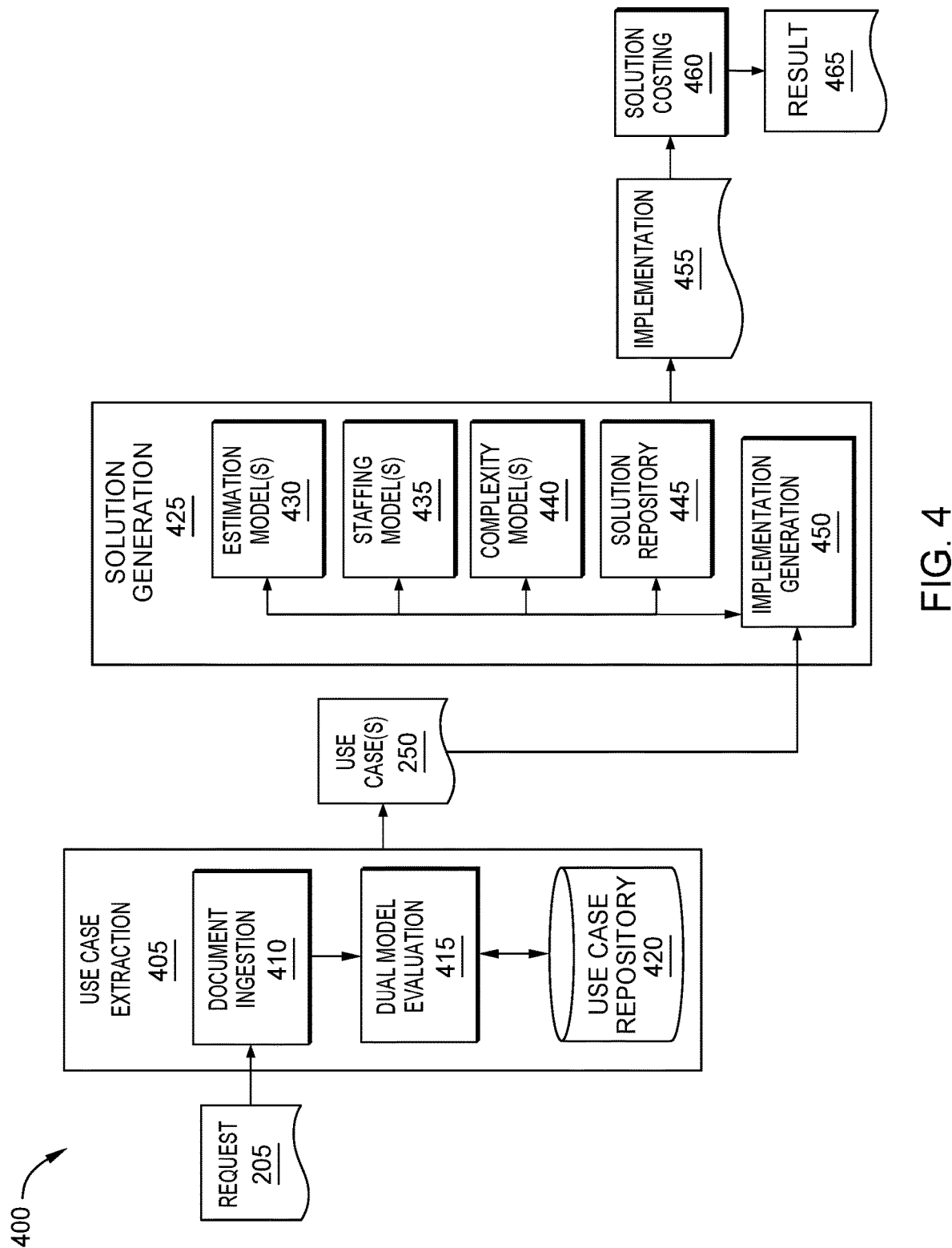
FIG. 4 illustrates an end-to-end workflow for utilizing machine learning to perform automated document analysis and implementation generating, according to one embodiment disclosed herein.

FIG. 4 illustrates an end-to-end workflow 400 for utilizing machine learning to perform automated document analysis and implementation generating, according to one embodiment disclosed herein. As discussed above, embodiments of the present system utilize a hybrid approach to combine feature graph model(s) and vector space model(s) to identify and extract relevant use cases for a given client request. In some embodiments, additional steps can be applied based on these use cases in order to generate implementation plans (e.g., estimates of labor effort and/or staffing) to satisfy the extracted use cases. Further, in at least one embodiment, this implementation can then be evaluated using one or more automation tools to predict the cost of the solution.

In the illustrated workflow 400, a Request 205 is processed in a first stage for Use Case Extraction 405. This stage is discussed in more detail above, and includes Document Ingestion 410 and a Dual Model Evaluation 415, which operates based on an existing Use Case Repository 420. As illustrated, this stage results in the identification of one or more Use Cases 250 that represent the requirements/functionality needed to satisfy the Request 205. In the illustrated embodiment, the Use Cases 250 serve as input for Solution Generation 425, which evaluates them in order to generate one or more Implementations 455. The Implementation 455 generally reflects staffing decisions, labor allocation, hardware and/or software needs, and the like.

In the illustrated workflow 400, the Solution Generation 425 includes an Implementation Generator 450 which receives the identified Use Cases 250 and generates one or more Implementations 455 based on one or more Estimation Model(s) 430, Staffing Model(s) 435, Complexity Model(s) 440, and/or Solution Repositories 445.

In one embodiment, prior implementation plans can be curated and stored in the Solution Repository 445. For example, for each prior solution, the corresponding use cases can be extracted and/or curated (such as by subject matter experts) to store in the Solution Repository 445. Similarly, in one embodiment, the Estimation Model(s) 430, Staffing Model(s) 435, and/or Complexity Model(s) 440 can be created based on the prior solutions in the Solution Repository 445. For example, a Staffing Model 435 may be generated to estimate staffing needs for a given set of Use Cases 250, based on staffing needs for prior completed solutions.

For example, suppose the Solution Repository 445 includes implementation information for an "account management" use case, including estimations, complexity, and/or staffing for the implementation. Based on the past experiences, the system can understand how to implement the use case. For example, based on data in the prior Solution Repository 445, the system can estimate the number of needed technical components (e.g. five user interface forms, six backend logic elements, etc.) and know that this is a low complexity case. The Estimation Model 430 may be an artefact that uses these complexity parameters to estimate the time needed to implement each use case. When each of the current/relevant use cases are thus estimated, the system can predict the overall time needed for the implementation. Further, in an embodiment, the Staffing Model 435 can convert the estimated hours into a schedule for developers, testers, and the like, indicating the dates each will work, the band and skill sets of each, and the like.

In the illustrated embodiment, the Use Cases 250 extracted in Use Case Extraction 405 can be mapped to the use cases in the Solution Repository 445. This allows the system to identify and retrieve the corresponding estimation sheet(s) and/or staffing model(s) for those identified similar solutions. Further, in at least one embodiment, the system utilizes the Complexity Model(s) 440 to estimate the complexity of the Implementation 455. In some embodiments, the Solution Generation 425 results in multiple potential Implementations 455, which can be evaluated and compared to identify an optimal solution (e.g., based on cost, delay, difficulty, and the like).

In at least one embodiment, Solution Generation 425 includes identifying potential partners to achieve the solution. For example, if one or more orphaned requirements cannot be satisfied, the system can evaluate potential partners to determine which are able to serve the orphaned use case(s). In one embodiment, if multiple partners are able, the system can evaluate and score them based on a variety of factors. In one embodiment, this includes determining an estimated cost of the partner providing the solution, determining a quality of the partner, and the like. In at least one embodiment, the system considers prior partnerships/efforts in concert with each partner, in order to determine a probability that each partner can adequately and successfully satisfy the orphaned use cases.

In the illustrated workflow 400, once the Implementation 455 has been generated, Solution Costing 460 is performed to automatically perform cost case generation. This evaluation can include a wide variety of elements, and is performed based on the staffing model. For example, the system may consider the costs of labor for each element, the non-labor costs involved (e.g., travel, lodging, network connectivity, etc.), and the like. Advantageously, this can expedite determination of cost estimates for a wide variety of options and iterations, and provides estimates at an early stage of the solution development. This can help significantly with quick solution optimization, in order to match competitive targets.

Figure 5:
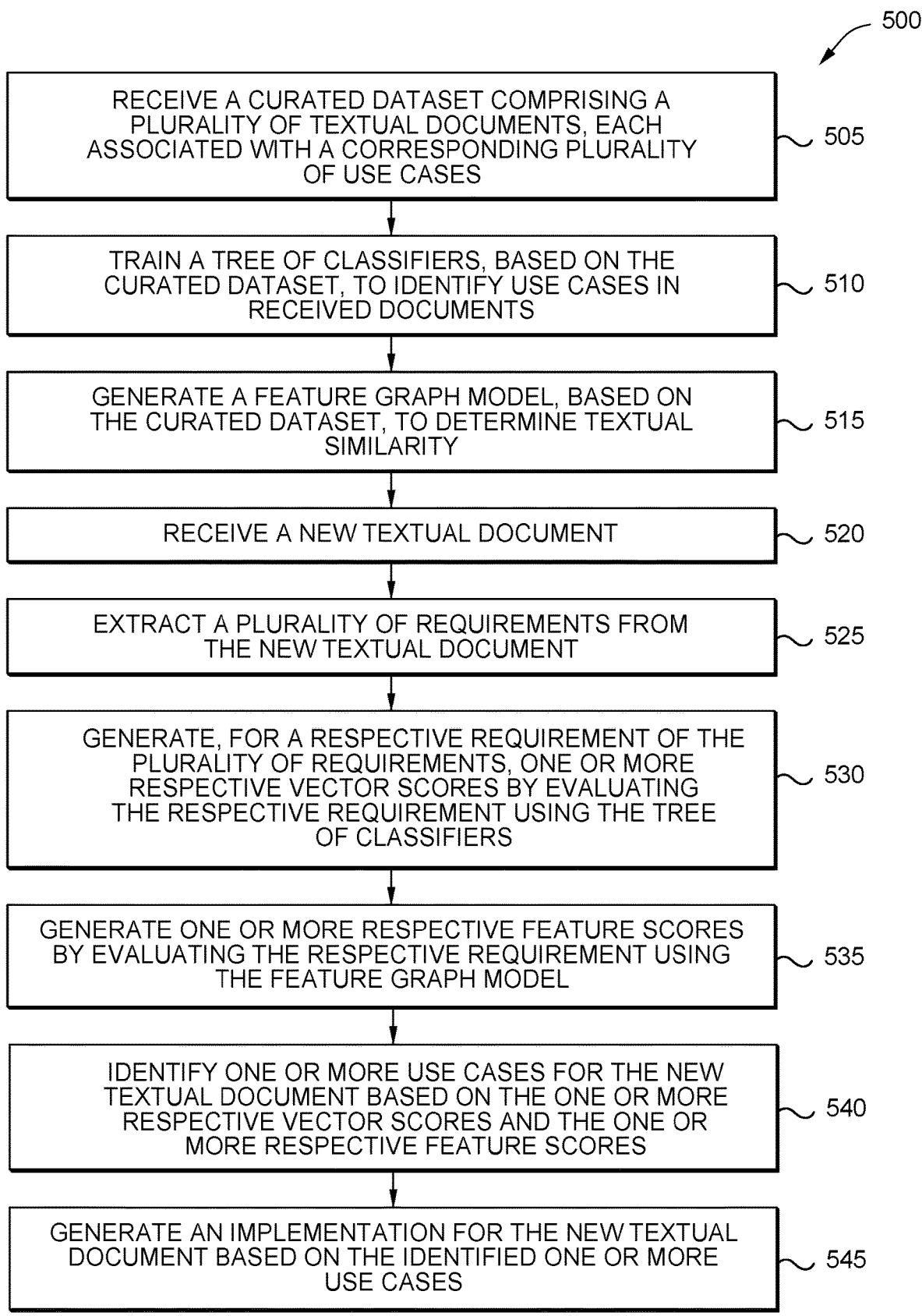
FIG. 5 is a flow diagram illustrating a method for document analysis and implementation generation, according to one embodiment disclosed herein.

FIG. 5 is a flow diagram illustrating a method 500 for document analysis and implementation generation, according to one embodiment disclosed herein. The method 500 begins at block 505, where an implementation system receives a curated dataset comprising a plurality of textual documents, each associated with a corresponding plurality of use cases. At block 510, the implementation system trains a tree of classifiers, based on the curated dataset, to identify use cases in received documents. Further, at block 515, the implementation system generates a feature graph model, based on the curated dataset, to determine textual similarity. At block 520, the implementation system receives a new textual document. The method 500 then continues to block 525, where the implementation system extracts a plurality of requirements from the new textual document. At block 530, the implementation system then generates, for a respective requirement of the plurality of requirements, one or more respective vector scores by evaluating the respective requirement using the tree of classifiers. Additionally, at block 535, the implementation system generates one or more respective feature scores by evaluating the respective requirement using the feature graph model. Further, at block 540, the implementation system identifies one or more use cases for the new textual document based on the one or more respective vector scores and the one or more respective feature scores. The method 500 then proceeds to block 545, where the implementation system generates an implementation for the new textual document based on the identified one or more use cases.

Figure 6:
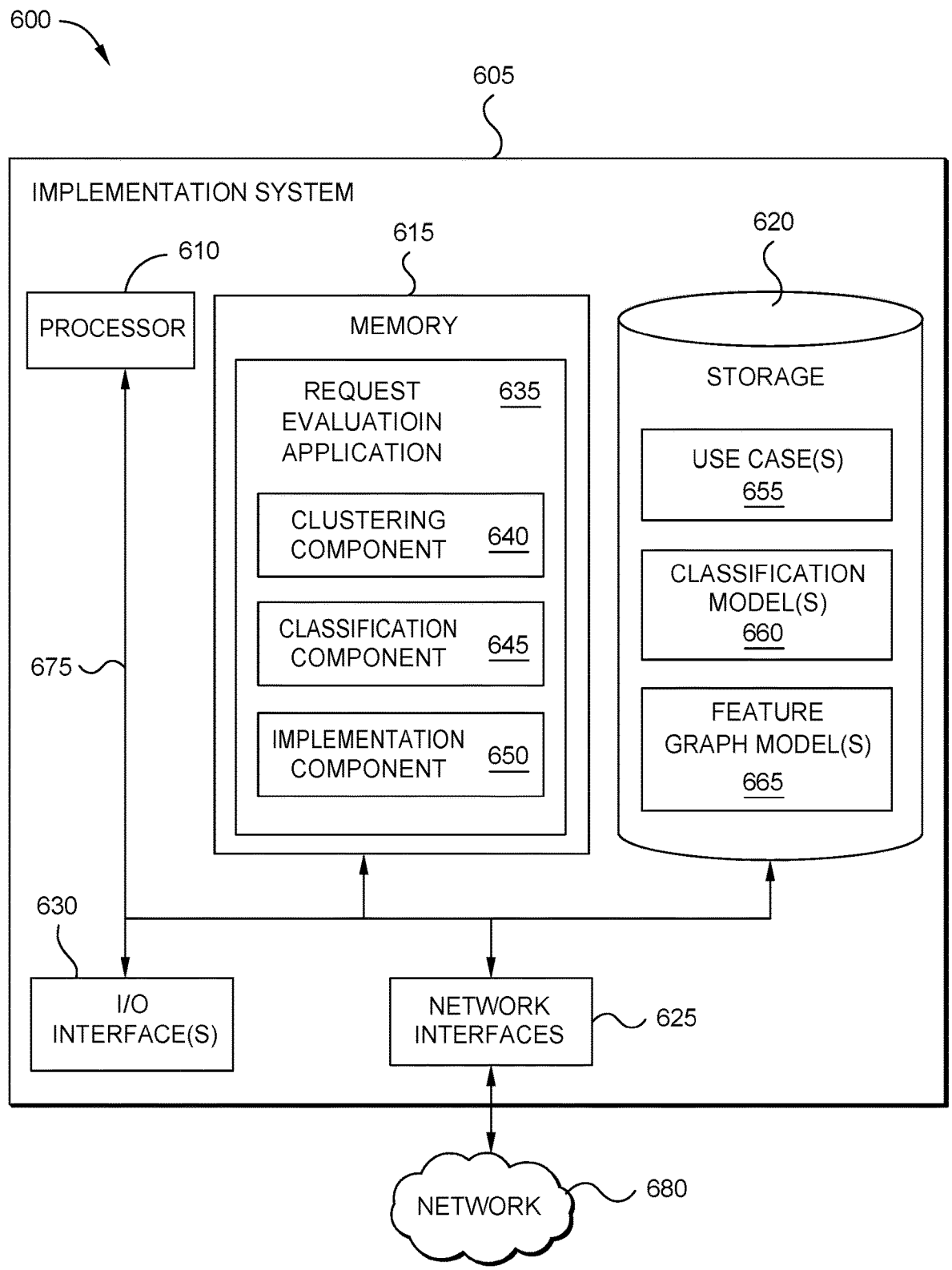
FIG. 6 depicts an implementation system configured to use machine learning to analyze documents and generate implementation architectures, according to one embodiment disclosed herein.

FIG. 6 depicts an Implementation System 605 configured to use machine learning to analyze documents and generate implementation architectures, according to one embodiment disclosed herein. Although depicted as a physical device, in embodiments, the Implementation System 605 may be implemented as a virtual device or service, and/or across a number of devices (e.g., in a cloud environment). As illustrated, the Implementation System 605 includes a Processor 610, Memory 615, Storage 620, a Network Interface 625, and one or more I/O Interfaces 630. In the illustrated embodiment, the Processor 610 retrieves and executes programming instructions stored in Memory 615, as well as stores and retrieves application data residing in Storage 620. The Processor 610 is generally representative of a single CPU and/or GPU, multiple CPUs and/or GPUs, a single CPU and/or GPU having multiple processing cores, and the like. The Memory 615 is generally included to be representative of a random access memory. Storage 620 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, input and output devices (such as keyboards, monitors, etc.) are connected via the I/O Interface(s) 630. Further, via the Network Interface 625, the Implementation System 605 can be communicatively coupled with one or more other devices and components (e.g., via the Network 680, which may include the Internet, local network(s), and the like). Additionally, the Network 680 may include wired connections, wireless connections, or a combination of wired and wireless connections. As illustrated, the Processor 610, Memory 615, Storage 620, Network Interface(s) 625, and I/O Interface(s) 630 are communicatively coupled by one or more Buses 675.

In the illustrated embodiment, the Storage 620 includes a set of prior Use Cases 655, one or more Classification Model(s) 660, and one or more Feature Graph Model(s) 665. The Use Cases 655 represent training data collected from prior evaluations. For example, each of the Use Cases 655 can include a textual description that can be used to identify the relevant Use Cases 655 for a newly-received document (e.g., using a Classification Model 660 and/or Feature Graph Model 665). As discussed above, the Classification Models 660 generally represent one or more hierarchical trees used to iteratively classify input documents in order to identify relevant Use Cases 655. Similarly, the Feature Graph Models 665 are built based on the Use Cases 655 and indicate the relationships among various terms and phrases in the use cases, which facilitates matching of new requests with existing Use Cases 655.

In the illustrated embodiment, the Memory 615 includes a Request Evaluation Application 635. Although depicted as software residing in Memory 615, in embodiments, the functionality of the Request Evaluation Application 635 can be implemented via software, hardware, or a combination of software and hardware. As illustrated, the Request Evaluation Application 635 includes a Clustering Component 640, a Classification Component 645, and an Implementation Component 650. Although depicted as discrete components for conceptual clarity, in embodiments, the operations of the Clustering Component 640, Classification Component 645, and Implementation Component 650 can be combined or distributed across any number of components and devices.

The Clustering Component 640 generally receives new textual requests and identifies one or more requirement clusters that are relevant for the request. For example, the Clustering Component 640 may cluster various portions of the new request into pre-existing clusters of requirements that are reflected in the Use Cases 655. Further, in one embodiment, the Classification Component 645 evaluates each of these newly-clustered requirements (from a new request) to map them with the appropriate Use Case(s) 655. In one embodiment, this includes utilizing both the Classification Model(s) 660 (e.g., a vector space model) and the Feature Graph Models) 665. Finally, the Implementation Component 650 can be used to assemble a coherent solution plan based on the identified use cases for newly-received requests, as discussed above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding and/or following, reference is made to embodiments presented in this disclosure. However, the scope of the present disclosure is not limited to specific described embodiments. Instead, any combination of the preceding and/or following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding and/or following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Request Evaluation Application 635) or related data available in the cloud. For example, the Request Evaluation Application 635 could execute on a computing system in the cloud and evaluate new requests to extract relevant use cases. In such a case, the Request Evaluation Application 635 could analyze requests to classify use cases and generate solutions, and store the new and/or prior solution data at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
  receiving a curated dataset comprising a plurality of textual documents, each associated with a corresponding plurality of use cases;
  training a tree of classifiers, based on the curated dataset, to identify use cases in received documents;
  generating a feature graph model, based on the curated dataset, to determine textual similarity;
  receiving a new textual document;
  extracting a plurality of requirements from the new textual document;
  for each respective requirement of the plurality of requirements:
    generating one or more respective vector scores by evaluating the respective requirement using the tree of classifiers;
    generating one or more respective feature scores by evaluating the respective requirement using the feature graph model; and
    identifying one or more use cases for the new textual document based on the one or more respective vector scores and the one or more respective feature scores; and generating an implementation for the new textual document based on the identified one or more use cases.

2. The method of claim 1, wherein generating the implementation comprises:
receiving a first repository indicating a first plurality of capabilities for a first entity; and
determining that at least a first use case of the identified one or more use cases can be satisfied by at least one of the first plurality of capabilities.

3. The method of claim 2, the method further comprising:
determining that a second use case of the identified one or more use cases cannot be satisfied by the first plurality of capabilities; and
classifying the second use case as an orphan.

4. The method of claim 3, the method further comprising:
receiving a second repository indicating a second plurality of capabilities for a second entity;
determining that the second use case can be satisfied by the second plurality of capabilities; and
computing a score for the second entity, based on a probability that the second entity will successfully satisfy the second use case.

5. The method of claim 1, wherein the tree of classifiers comprises:
(i) an industry classifier trained to identify a relevant industry for the new textual document;
(ii) at least one technical domain classifier trained to identify a technical domain for the new textual document; and
(iii) a plurality of use case classifiers, wherein each of the plurality of use case classifiers is associated with a corresponding use case.

6. The method of claim 1, wherein generating the feature graph model comprises:
extracting, from the plurality of textual documents, a set of relevant terms;
for each respective document of the plurality of textual documents, identifying collocated terms in the set of relevant terms that are collocated above a predefined threshold amount in the respective document; and
generating the feature graph model to reflect the collocated terms.

7. The method of claim 1, the method further comprising predicting a cost of the generated implementation.

8. A computer program product comprising one or more computer-readable storage media collectively containing computer-readable program code that, when executed by operation of one or more computer processors, performs an operation comprising:
receiving a curated dataset comprising a plurality of textual documents, each associated with a corresponding plurality of use cases;
training a tree of classifiers, based on the curated dataset, to identify use cases in received documents;
generating a feature graph model, based on the curated dataset, to determine textual similarity;
receiving a new textual document;
extracting a plurality of requirements from the new textual document;
for each respective requirement of the plurality of requirements:
generating one or more respective vector scores by evaluating the respective requirement using the tree of classifiers;
generating one or more respective feature scores by evaluating the respective requirement using the feature graph model; and
identifying one or more use cases for the new textual document based on the one or more respective vector scores and the one or more respective feature scores; and
generating an implementation for the new textual document based on the identified one or more use cases.

9. The computer program product of claim 8, wherein generating the implementation comprises:
receiving a first repository indicating a first plurality of capabilities for a first entity; and
determining that at least a first use case of the identified one or more use cases can be satisfied by at least one of the first plurality of capabilities.

10. The computer program product of claim 9, the operation further comprising:
determining that a second use case of the identified one or more use cases cannot be satisfied by the first plurality of capabilities; and
classifying the second use case as an orphan.

11. The computer program product of claim 10, the operation further comprising:
receiving a second repository indicating a second plurality of capabilities for a second entity;
determining that the second use case can be satisfied by the second plurality of capabilities; and
computing a score for the second entity, based on a probability that the second entity will successfully satisfy the second use case.

12. The computer program product of claim 8, wherein the tree of classifiers comprises:
(i) an industry classifier trained to identify a relevant industry for the new textual document;
(ii) at least one technical domain classifier trained to identify a technical domain for the new textual document; and
(iii) a plurality of use case classifiers, wherein each of the plurality of use case classifiers is associated with a corresponding use case.

13. The computer program product of claim 8, wherein generating the feature graph model comprises:
extracting, from the plurality of textual documents, a set of relevant terms;
for each respective document of the plurality of textual documents, identifying collocated terms in the set of relevant terms that are collocated above a predefined threshold amount in the respective document; and
generating the feature graph model to reflect the collocated terms.

14. The computer program product of claim 8, the operation further comprising predicting a cost of the generated implementation.

15. A system comprising:
one or more computer processors; and
one or more memories collectively containing one or more programs which when executed by the one or more computer processors performs an operation, the operation comprising:
receiving a curated dataset comprising a plurality of textual documents, each associated with a corresponding plurality of use cases;
training a tree of classifiers, based on the curated dataset, to identify use cases in received documents;
generating a feature graph model, based on the curated dataset, to determine textual similarity;
receiving a new textual document;
extracting a plurality of requirements from the new textual document;

for each respective requirement of the plurality of requirements:
  generating one or more respective vector scores by evaluating the respective requirement using the tree of classifiers;
  generating one or more respective feature scores by evaluating the respective requirement using the feature graph model; and
  identifying one or more use cases for the new textual document based on the one or more respective vector scores and the one or more respective feature scores; and
generating an implementation for the new textual document based on the identified one or more use cases.

16. The system of claim 15, wherein generating the implementation comprises:
  receiving a first repository indicating a first plurality of capabilities for a first entity; and
  determining that at least a first use case of the identified one or more use cases can be satisfied by at least one of the first plurality of capabilities.

17. The system of claim 16, the operation further comprising:
  determining that a second use case of the identified one or more use cases cannot be satisfied by the first plurality of capabilities; and
  classifying the second use case as an orphan.

18. The system of claim 17, the operation further comprising:
  receiving a second repository indicating a second plurality of capabilities for a second entity;
  determining that the second use case can be satisfied by the second plurality of capabilities; and
  computing a score for the second entity, based on a probability that the second entity will successfully satisfy the second use case.

19. The system of claim 15, wherein the tree of classifiers comprises:
  (i) an industry classifier trained to identify a relevant industry for the new textual document;
  (ii) at least one technical domain classifier trained to identify a technical domain for the new textual document; and
  (iii) a plurality of use case classifiers, wherein each of the plurality of use case classifiers is associated with a corresponding use case.

20. The system of claim 15, wherein generating the feature graph model comprises:
  extracting, from the plurality of textual documents, a set of relevant terms;
  for each respective document of the plurality of textual documents, identifying collocated terms in the set of relevant terms that are collocated above a predefined threshold amount in the respective document; and
  generating the feature graph model to reflect the collocated terms.

* * * * *